June 22, 1943.  E. E. TURNER, JR  2,322,264
APPARATUS FOR ECHO DISTANCE MEASUREMENT
Original Filed Nov. 22, 1940
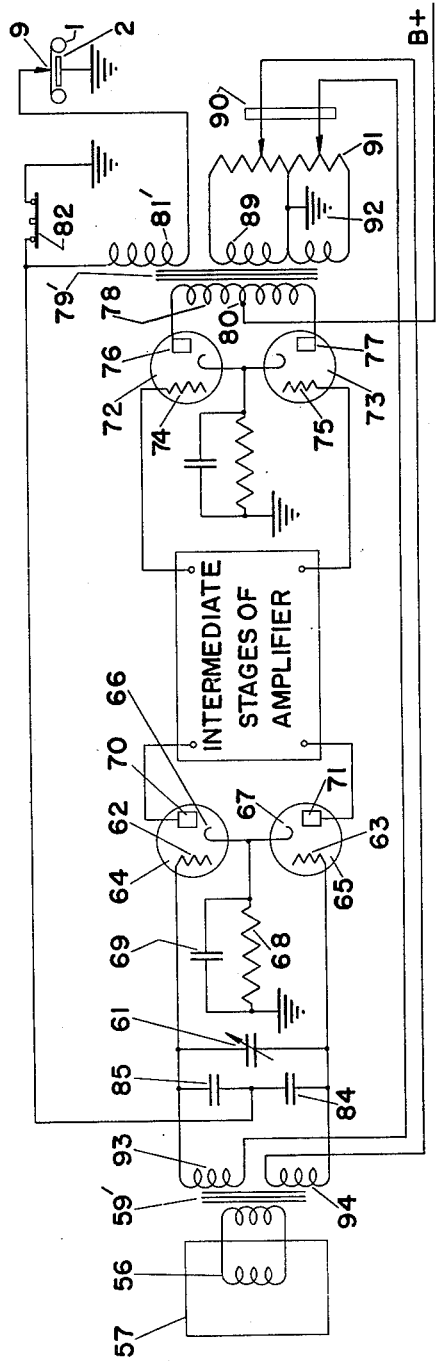
INVENTOR
EDWIN E. TURNER JR.
BY
ATTORNEY Patented June 22, 1943

2,322,264

UNITED STATES PATENT OFFICE 2,322,264

APPARATUS FOR ECHO DISTANCE MEASUREMENT

Edwin E. Turner, Jr., West Roxbury, Mass., assignor to Submarine Signal Company, Boston, Mass., a corporation of Maine Original application November 22, 1940, Serial No. 366,638. Divided and this application July 25, 1941, Serial No. 404,053

4 Claims. (Cl. 177—386)

The present application is a division of my copending application Serial No. 366,638, filed November 22, 1940.

The present invention relates to echo distance measuring systems and to recording apparatus therefor.

The general principle of echo distance measurement and depth sounding is well known. A compressional wave impulse is transmitted to the water and the reflected signal is received and used to operate an indicator. The time interval between the emitted signal and the received echo is a measure of the distance or depth. This time interval is frequently measured by comparing it with a constant known speed. Thus where a record of the depth is desired, a marking element is usually moved at a constant speed over a chart, a signal impulse being emitted at the instant the marking point crosses a zero line on the chart and a mark being made on the chart at the instant the echo is received. If the chart be continuously advanced between soundings, the record of the successive periodic measurements will form a graph of the depths traversed. Recording instruments of this type have heretofore been used with more or less success. If a record is not required, an indication can be produced as with the aid of a continuously rotating indicator. In this case the signal impulse is emitted at the instant the indicator passes a reference mark on an adjacent dial and the indicator is operated at the instant the echo is received whereby the position of the indicator, when it is operated, shows the depth being measured.

The present invention relates more particularly to a receiving circuit for receiving the echo and causing the same to produce a mark on the record paper or to operate an indicator. When long distances are being measured, the time interval between the emission of the signal impulse and the receipt of the echo is relatively long and the returning echo is relatively weak. Consequently in this case it is necessary to use a high gain amplifier in order that the signal impulse may have sufficient energy to operate the indicating device. For this reason it is usually desirable to use a highly resonant amplifier tuned to the frequency of the signal impulse. The sharp resonance curve of such an amplifier not only serves to bring about high amplification of the echo impulse, but also to eliminate the stray signals which are not of the signal frequency. However, such a sharply tuned amplifier requires a definite time to build up to a sufficient potential to operate the indicator. An error is thus introduced into the time interval measurement. This error is small and is not significant when large distances are being measured. On the other hand, when small distances are being measured, the time interval involved is relatively short. The time required for the amplifier to build up to a sufficient potential to operate the indicator then becomes of importance. By means of the present invention the time delay of the amplifier can be reduced while simultaneously preserving the system's discrimination against undesired signals.

The invention will best be understood from the following description taken in connection with the schematic diagram in the accompanying drawing.

A compressional wave receiver having a voltage generating coil 56 is schematically indicated at 57. The coil 56 is connected to the primary of an amplifier input transformer 59'. The secondary of this transformer is formed of two separate windings 93 and 94. The outer terminals of these windings are shunted by the tuning condenser 61 and connected to the grids 62 and 63 of amplifier tubes 64 and 65, respectively, which are connected in push pull. The cathodes 66 and 67 of these tubes are grounded through resistor 68 and capacitor 69. The anodes 70 and 71 of the two tubes are connected through intermediate amplifier stages to the grids 74 and 75 of the last amplifier stage indicated at 72 and 73. In each stage the cathodes are grounded through a resistor and capacitor as in the case of the first stage. The anodes 76 and 77 are connected across the primary 78 of the output transformer 79'. The anodes 76 and 77 are provided with a potential by means of the center-tap connection 80 on the primary 78 which is connected to the positive terminal of the plate supply source, the negative terminal being grounded. The secondary of transformer 79' has two secondary windings, an indicator operating winding 81' and a center-tapped winding 89. One end of the secondary winding 81' is connected to the indicator, here shown as the marking stylus 9 of a recorder, the other terminal of the winding 81' being connected through a push-button type normally closed switch 82 to ground. The recorder stylus circuit is completed to ground through the record paper 1 and the conductive platen 2 which is grounded. It is contemplated to use a record paper of the type having a conductive carbon back with a thin light-colored coating on its front surface which is removed by the passage of an electric current through the paper. Further details of a suitable recorder can be found in my copending application Serial No. 312,504, filed January 5, 1940. Other types of recorders or indicating devices may, of course, be used if desired.

The center-tap winding 89 of the output transformer has two similar series-connected variable potentiometer-type resistors 90 and 91 connected across it. The common terminal of the resistors is connected to the center tap of the winding 89, this connection being grounded at 92. The variable contacts of resistors 90 and 91, which are arranged to be operated in unison, are connected respectively to the inner ends of the two secondary windings 93 and 94 of the input transformer. By this means a variable negative feed-back is provided which controls the amplifier sensitivity and sharpness of the tuning. By reducing the amount of the feed-back, the sharpness of the amplifier resonance curve and the amplifier's sensitivity are increased. By increasing the negative feed-back, the amplifier's resonance curve is broaded and there is a consequent decrease in the receiver's sensitivity.

Therefore, for shallow depths where the echo impulse is of relatively high intensity, a relatively large amount of negative feed-back can be used while sufficient voltage will nevertheless be built up by the amplifier to operate the indicator which is here shown as the marking stylus of the recorder. This reduction in sensitivity operates to eliminate a great many undesired signals which may be received by the device 57. However, due to the broadening of the amplifier resonance curve, the time required for the amplifier to build up to a sufficient potential to operate the indicator is reduced, thereby reducing the error which the amplifier's time delay would otherwise introduce into the time interval measurement.

It will be readily understood by those skilled in the art that this variable feed-back arrangement can be used to provide a sensitivity control for single-sided amplifiers as well as for the push-pull amplifier here shown. It can also obviously be applied to other types of indicators in addition to recording stylus herein shown.

Having now described my invention, I claim:

1. In an echo distance measuring system of the type in which the time interval is measured between direct and reflected signal impulses, the reflected impulse being of definite frequency and of an intensity which decreases as the length of the time interval being measured increases, the combination of a signal receiver adapted to receive said reflected impulses, a normally sharply tuned amplifier for said received impulses, an indicator adapted to be operated thereby and means under the control of the operator for negatively feeding back controllable portions of energy from the amplifier output into the amplifier input so that greater feed-back reduces sharpness of tuning and sensitivity, whereby control of the sensitivity of the system simultaneously reduces error in the time of operation of the indicator for short-time intervals being measured and increases the selectivity of the system for large-time intervals being measured.

2. In an echo distance measuring system of the type in which the time interval is measured between direct and reflected signal impulses, the reflected impulse being of definite frequency and of an intensity which decreases as the length of the time interval being measured increases, the combination of a signal receiver adapted to receive said reflected impulses, a normally sharply tuned amplifier for said received impulses, an indicator adapted to be operated thereby and means for negatively feeding back controllable portions of energy from the amplifier output into the input so that greater feed-back reduces sharpness of tuning and sensitivity, whereby control of the sensitivity of the system simultaneously reduces error in the time of operation of the indicator for short-time intervals being measured and increases the selectivity of the system for large-time intervals being measured.

3. In an echo distance measuring system of the type in which the time interval is measured between direct and reflected signal impulses, the reflected impulse being of definite frequency, the combination of a signal receiver, a tuned push-pull amplifier having an output circuit for operating an indicator, and means for abstracting the same controllable portion of energy from each side of said output circuit and feeding the same back into the amplifier input in opposite polarity to received signal impulses so that greater feed-back reduces sharpness of tuning and sensitivity, whereby control of the sensitivity of the system simultaneously reduces error in the time of operation of the indicator for short-time intervals being measured and increases the selectivity of the system for large-time intervals being measured.

4. In an echo distance measuring system of the type in which the time interval is measured between direct and reflected signal impulses, the reflected impulse being of definite frequency, the combination of a signal receiver, an amplifier connected to said receiver and having an output transformer with two secondary windings, an indicator, means connecting one of said secondaries to said indicator and means for feeding back a controllable portion of the potential of the other secondary to the amplifier input in opposition to the potential of said signal receiver so that greater feed-back reduces sharpness of tuning and sensitivity, whereby control of the sensitivity of the system simultaneously reduces error in the time of operation of the indicator for short-time intervals being measured and increases the selectivity of the system for large-time intervals being measured.

EDWIN E. TURNER, Jr.